US008355635B1

(12) United States Patent
Liu et al.

(10) Patent No.: US 8,355,635 B1
(45) Date of Patent: Jan. 15, 2013

(54) GYRO-AIDED POINTING CONTROL FOR LASER COMMUNICATIONS

(75) Inventors: Ketao Liu, Cerritos, CA (US);
Qinghong W. Wang, Torrance, CA (US)

(73) Assignee: The Boeing Company, Chicago, IL (US)

( * ) Notice: Subject to any disclaimer, the term of this patent is extended or adjusted under 35 U.S.C. 154(b) by 542 days.

(21) Appl. No.: 12/551,787

(22) Filed: Sep. 1, 2009

(51) Int. Cl.
*H04B 10/00* (2006.01)
*G06F 19/00* (2006.01)
*G01S 5/14* (2006.01)

(52) U.S. Cl. ........ 398/122; 398/123; 398/131; 244/171; 244/172.5; 701/13; 701/4; 701/220; 342/357.14; 342/359

(58) Field of Classification Search .................. 398/123, 398/122; 701/13
See application file for complete search history.

(56) References Cited

U.S. PATENT DOCUMENTS

| | | | | |
|---|---|---|---|---|
| 6,072,571 A * | 6/2000 | Houlberg | ................ | 356/139.04 |
| 6,091,528 A * | 7/2000 | Kanda | .................. | 398/122 |
| 6,195,044 B1 * | 2/2001 | Fowell | .................. | 342/367 |
| 6,278,100 B1 * | 8/2001 | Friedman et al. | ........ | 250/201.9 |
| 6,347,001 B1 * | 2/2002 | Arnold et al. | ............ | 398/122 |
| 6,463,366 B2 * | 10/2002 | Kinashi et al. | ............ | 701/13 |
| 6,768,876 B1 * | 7/2004 | Steiger et al. | ............ | 398/156 |
| 6,816,112 B1 * | 11/2004 | Chethik | .................. | 342/357.31 |
| 7,437,224 B2 * | 10/2008 | Tsao et al. | .................. | 701/13 |
| 7,986,265 B2 * | 7/2011 | Alexander et al. | ....... | 342/357.36 |
| 8,049,870 B2 * | 11/2011 | Mosier et al. | ............ | 356/29 |
| 2002/0169578 A1 * | 11/2002 | Yang | .................. | 702/152 |
| 2005/0026462 A1 * | 2/2005 | Johnson et al. | ............ | 439/13 |
| 2005/0060092 A1 * | 3/2005 | Hablani | ............ | 701/213 |
| 2005/0069325 A1 * | 3/2005 | Cicchiello et al. | ............ | 398/122 |
| 2006/0022115 A1 * | 2/2006 | Byren | .................. | 250/201.9 |
| 2006/0065788 A1 * | 3/2006 | Tsao et al. | .................. | 244/171 |
| 2007/0031151 A1 * | 2/2007 | Cunningham et al. | ........ | 398/131 |
| 2009/0324236 A1 * | 12/2009 | Wu et al. | .................. | 398/122 |
| 2010/0066597 A1 * | 3/2010 | Tyree et al. | ............ | 342/195 |

OTHER PUBLICATIONS

Lee ["Atmosphere Tolerant Acquisition Tracking and Pointing Subsystem" Jet Propulsion Laboratory 2003].*
Moreau, M. et al. "Hardware in-the-Loop Demonstration of Real-Time Orbit Determination in High Earth Orbits." ION National Technical Meeting, San Diego, CA, Jan. 24-26, 2005.
Bamford, W. et al. "Real-Time Geostationary Orbit Determination Using the Navigator GPS Receiver."
Bamford, W. et al. "Navigation Performance in High Earth Orbits Using Navigator GPS Receiver." American Astronautical Society, 29th Annual AAS Guidance and Control Conference, Feb. 4-8, 2006, Breckenridge, CO.
Agrawal, Brij. N., et al., Optical Beam Control Testbeds, AIAA Guidance, Navigation and Control Conference and Exhibit, Aug. 18-21, 2008, Honolulu, Hawaii, AIAA 2008-6639, pp. 1-16.
Watkins, R. Joseph, Use of Least Means Squares Filter in Control of Optical Beam Jitter, Journal of Guidance, Control, and Dynamics, vol. 30, No. 4, Jul.-Aug. 2007, pp. 1116-1122.
SPIE Digital Library, Spatial tracking using an electro-optic nutator and a single-mode optical fiber, Proc. SPIE 1635, 309 (1992); http://dx.doi.org/10.1117/12.59284.

* cited by examiner

*Primary Examiner* — Shi K Li
*Assistant Examiner* — Oommen Jacob
(74) *Attorney, Agent, or Firm* — Charles L. Moore; Moore & Van Allen PLLC

(57) ABSTRACT

A method for pointing control of a laser communication terminal on a spacecraft may include measuring a line-of-sight (LOS) error of the laser communication terminal. The method may also include estimating a LOS error of the laser communication terminal based on measurements from a spacecraft gyro and a gimbal gyro onboard the spacecraft. The method may further include switching from a LOS error measurement feedback to a LOS error estimate feedback to control pointing of the laser communication terminal during a power fade condition.

16 Claims, 3 Drawing Sheets

GYRO-AIDED POINTING CONTROL FOR LASER COMMUNICATIONS

This invention was made with Government support under contract number FA8808-04-C-0022 awarded by the United States Air Force. The Government has certain rights in this invention.

FIELD

The present disclosure relates to communication and spacecraft communication, and more particularly to a system and method for gyro-aided pointing control for laser communications and line-of-sight (LOS) jitter control in a power fade environment.

BACKGROUND

Free-Space Laser Communications (Lasercom) requires high-precision pointing control to track a remote laser communication terminal or lasercom terminal so that the two terminals can maintain a laser communications link between them. The pointing, acquisition, and tracking system of the laser communication terminal typically uses two-axis gimbals for coarse pointing control to an accuracy of several hundred micro-radians and a Fast Steering Mirror (FSM) for fine track control to maintain pointing to within micro-radians. A major source of LOS error may be from base jitter or motion of the laser communication terminal that may be created by structure vibration of the host spacecraft. The base jitter may be caused by other moving parts of the spacecraft, such as rotating wheels, thrusters or similar devices for maintaining stability and position of the spacecraft.

The FSM position control is typically based on the feedback of a measured LOS error (also called track error), representing a measure of LOS jitter of a received laser signal from the remote laser communication terminal. The LOS error measurement may be made with an optical receiver responding to the laser beam from the remote terminal. An FSM control algorithm may calculate a control signal to drive the FSM to null or substantially mitigate the jitter. However, in the condition of power fade where the signal power of the received laser beam or signal is reduced because of interference, noise or other causes, the LOS error measurement may become unreliable because of excessive noises.

BRIEF SUMMARY

In accordance with an embodiment, a method for pointing control of a laser communication terminal onboard a spacecraft may include measuring a line-of-sight (LOS) error of the laser communication terminal. The method may also include estimating a LOS error of the laser communication terminal based on measurements from a spacecraft gyro and a gimbal gyro onboard the spacecraft. The method may further include switching from a LOS error measurement feedback to a LOS error estimate feedback to position the FSM for controlling pointing of the laser communication terminal during a power fade condition.

In accordance with another embodiment, a method for pointing control of a laser communication terminal onboard a spacecraft may include determining an estimated base jitter of the laser communication terminal. The method may also include measuring a LOS error of the laser communication terminal and measuring a position of a fast steering mirror that controls pointing of the laser communication terminal. A signal power of a laser signal received by the laser communication terminal from a remote laser communication terminal being tracked for communications may be measured. The method may additionally include estimating a LOS error based on the base jitter of the laser communication terminal and the measured FSM position. The LOS error estimate may be used as a FSM error to control positioning of the fast steering mirror in response to the measured signal power of the laser signal received from the remote laser communication terminal being less than a predetermined threshold. Alternative, the measured LOS error may be used as the FSM error to control positioning of the fast steering mirror in response to the measured signal power being greater than the predetermined threshold.

In accordance with another embodiment, a system for pointing control of a laser communication terminal may include a processor. The processor may be in the laser communication terminal mounted onboard a spacecraft. A gyro-aided fine track control module is operable on the processor. The gyro-aided fine track control module may include a LOS error estimator and a switching logic module. The LOS error estimator may be adapted to estimate a LOS error based on measurements from a spacecraft gyro and a gimbal gyro onboard the spacecraft. The switching logic module may be adapted to switch from using a LOS error measurement to using a LOS error estimate to generate a FSM control command for pointing control of the laser communication terminal during a power fade condition.

In accordance with another embodiment, a computer program product for pointing control of a laser communication terminal onboard a spacecraft includes a computer readable storage medium having computer readable program code embodied therewith. The computer readable program code may include computer readable program code configured to measure a LOS error of the laser communication terminal. The computer readable program code may also include computer readable program code configured to estimate a LOS error of the laser communication terminal based on measurements from a spacecraft gyro and a gimbal gyro onboard the spacecraft. The computer readable program code may additionally include computer readable program code configured to switch from a LOS error measurement feedback to a LOS error estimate feedback for controlling pointing of the laser communication terminal during a power fade condition.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the disclosure. Other embodiments having different structures and operations do not depart from the scope of the present disclosure.

DETAILED DESCRIPTION

Figure 1:
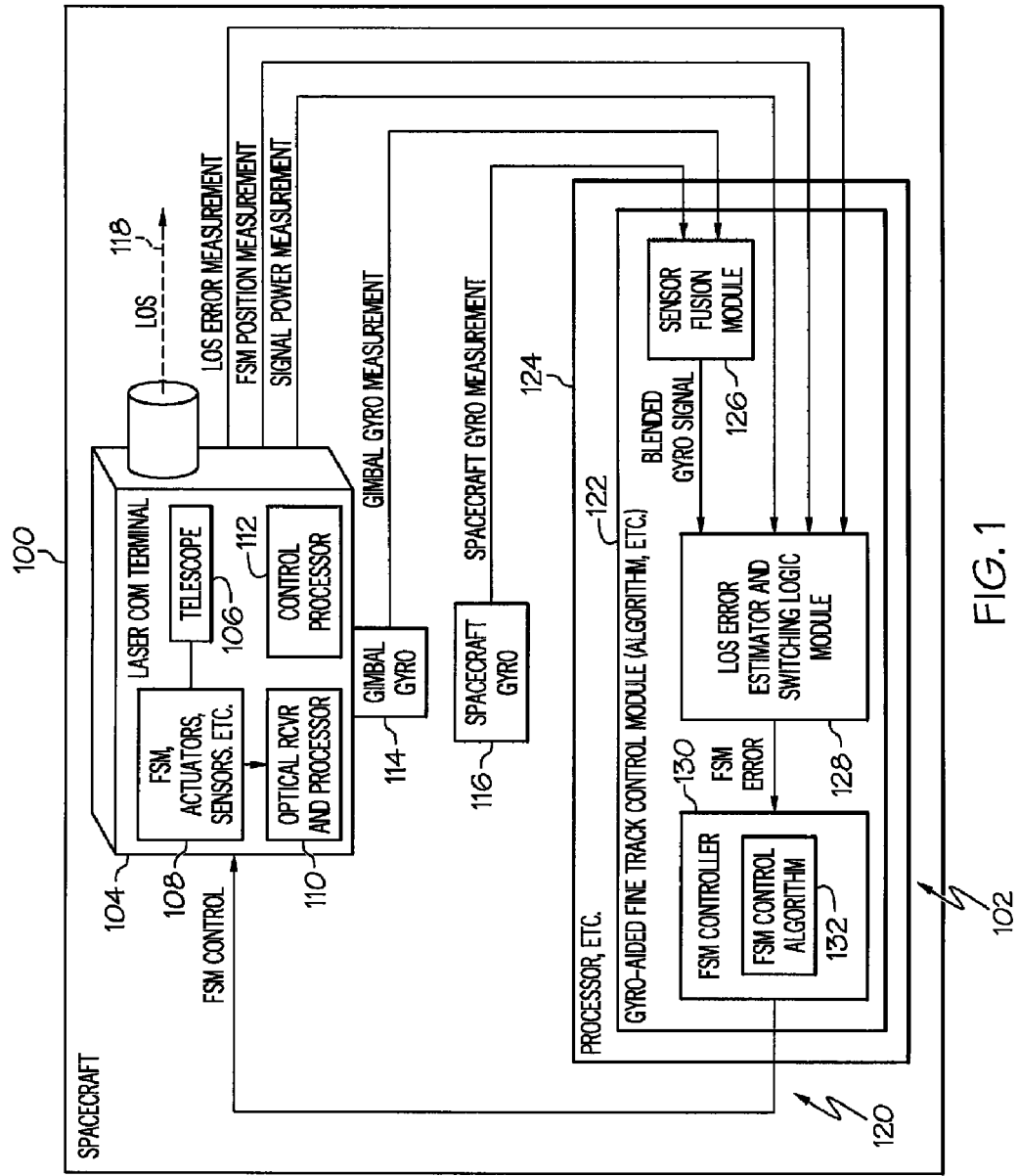
FIG. 1 is a block schematic diagram of an exemplary spacecraft including a system for pointing control of a laser communication terminal on the spacecraft in accordance with an embodiment of the present disclosure.

The following detailed description of embodiments refers to the accompanying drawings, which illustrate specific embodiments of the disclosure. Other embodiments having different structures and operations do not depart from the scope of the present disclosure.

As will be appreciated by one of skill in the art, features of the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in base band or as part of a carrier wave. Such a propagated signal may take any of a variety of forms, including, but not limited to, electro-magnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block schematic diagram of an exemplary spacecraft 100 including a system 102 for controlling pointing of a laser communication terminal 104 onboard the spacecraft 100 in accordance with an embodiment of the present disclosure. The laser communication terminal 104 may include a receive/transmit telescope 106 or similar device for receiving and transmitting laser communications signals. The laser communication terminal 104 may also include a fast steering mirror (FSM) device 108. the FSM 108 may reflect an incoming laser beam image toward a two axis optical receiver 110. The FSM device 108 may also include actuators that steer the FSM 108 position based on a FSM control command signal. The FSM device 108 may also include position sensors that can read or measure a position of the FSM.

The optical receiver 110 and associated processor may sense signal power of a received laser beam or signal from a remote laser communications terminal or similar apparatus. The optical receiver 110 and associated processor may sense signal power and provide an estimate of LOS pointing error or a LOS error measurement. Accordingly, the laser communications terminal 104 may provide a LOS error measurement, a FSM position measurement, and a signal power measurement to the system 102 for pointing control of the laser communications terminal 104.

The laser communication terminal 104 may also include a control processor 112. The control processor 112 may provide signal processing and control of operations of the laser communications terminal 104, including gyro-aided fine track control module 122.

The laser communication terminal 104 may be mounted on gimbals (not shown) to permitting pointing or directing the telescope 106 in different directions for laser communications with remote laser communication terminals or other devices. At least one gimbal gyro or angular rate sensor 114 may be associated with at least one of the gimbals for pointing and directing the laser communication terminal 104. The gimbal gyro or angular rate sensor 114 may measure angular velocity of the laser communication terminal 104. The gimbal gyro 114 measurement may be provided to the system 102 for controlling pointing of the laser communications terminal 104 as described herein.

The spacecraft 100 may also include at least one spacecraft gyro 116 or a gyro for each degree of freedom of motion of the spacecraft 100 to sense the angular velocity of the spacecraft 100. The spacecraft gyro 116 may measure angular velocity of the spacecraft 100. The spacecraft gyro 116 measurement may also be provided to the system 102 for controlling pointing of the laser communications terminal 104 as described herein.

As described herein the laser communication terminal 104 may track signals from a remote laser terminal (not shown in FIG. 1) to maintain a communication link between the terminals. Substantially high-precision pointing control is desired so that the laser communication terminal 104 can continuously track the laser signal from the remote laser communication terminal and the LOS laser communication link 118 can be maintained. The orientation of the telescope 106 or laser communication terminal 104 may be steered or directed by a coarse control loop with two-axis gimbals (not shown) and a gyro-aided fine track control loop 120 with the Fast Steering Mirror for controlling the pointing direction of the telescope 106 and laser communication terminal 104.

The gyro-aided fine track control loop 120 may include a gyro-aided fine track control module 122. The gyro-aided fine track control module 122 may be embodied in hardware, firmware, software, such as an algorithm, or a combination of these. The gyro-aided fine track control module 122 may be operable on a processor 124 or similar computing device. The processor 124 may be part of the laser communications terminal 104. The processor 124 may also be the control processor 112.

The gyro-aided fine track control module 122 may include a sensor fusion module 126. The sensor fusion module 126 receives the gimbal gyro measurement and the spacecraft gyro measurement and blends the gyro measurements to provide a blended gyro signal. The sensor fusion module 126 computes an angular velocity of the laser communication terminal's base motion by blending the spacecraft gyro measurement and the gimbal gyro measurement and any other gyro measurements deemed appropriate to generate a blended gyro signal.

A bandwith of spacecraft gyro 116 is typically limited to less than about 10 Hz. The gimbal gyro 114, for example, a high performance angular rate sensor for space applications, may have bandwidth from 1 to 1000 Hz. Neither the spacecraft gyro 116 nor the gimbal gyro 114 alone can provide accurate angular rate information about the base motion of the laser communication terminal 104 because of the limitation in the bandwidths of the spacecraft gyro 116 and gimbal gyro 114. Combining the range of both sensors or gyros can provide adequate angular rate information of the laser communication terminal 104 base motion or jitter. Sensor fusion 126 is a process to blend measurements from two or more sensor measurements. Sensor fusion 126 may be done using simple filters. Under some circumstances a more complex filter, such as a Kalman filter may be needed.

The gyro-aided fine track control module 122 may also include a LOS error estimator and switching control logic module 128. An example of a LOS error estimator and switching control logic that may be used for the module 128 will be described with reference to FIG. 2. The LOS error estimator may be a separate component from the switching logic as described in the example in FIG. 2. The LOS error estimator and switching logic module 128 may receive the blended gyro signal from the sensor fusion 126 and the LOS error measurement and FSM position measurement from the laser communication terminal 104. The LOS error estimator and switching logic module 128 may also receive a signal power measurement from the laser communication terminal 104. The signal power measurement may be used to switch between using the LOS error measurement and the LOS error estimate in the feedback loop 120 to generate FSM control command similar to that described with reference to the example in FIG. 2. As described in more detail herein, the LOS error may be estimated based on the blended gyro signal or measurement, the LOS error measurement and the FSM position measurement.

The gyro-aided fine track control module 122 may also include a FSM controller 130. An FSM control algorithm 132 may be embodied in the FSM controller 130. The FSM controller 130 may receive an FSM error from the LOS error estimator and switching logic module 128. As described herein, the FSM error may correspond to either the measured LOS error or the estimated LOS error depending upon the signal power measurement. The FSM control algorithm may calculate a FSM control command signal and through feedback control to the FSM may null or substantially mitigate LOS error resulting from base jitter of the laser communication terminal 104.

Figure 2:
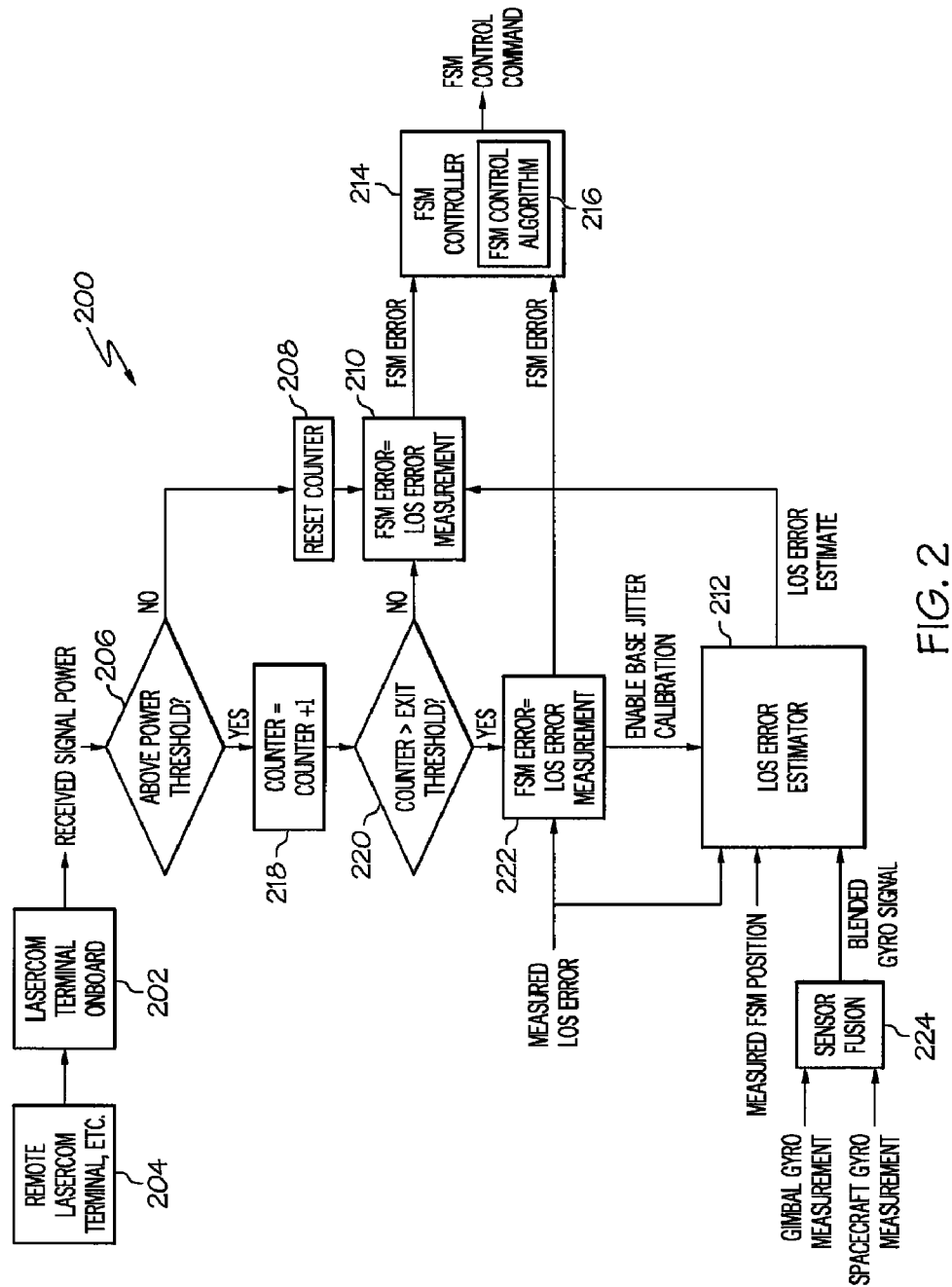
FIG. 2 is a flow chart of an exemplary method of gyro-aided pointing control of a laser communication terminal in accordance with an embodiment of the present disclosure.

FIG. 2 is a flow chart of an exemplary method 200 for pointing control of a laser communication terminal 202 in accordance with an embodiment of the present disclosure. The method 200 may be embodied in the LOS error estimator and switching logic 128 in FIG. 1. The laser communication terminal 202 or lasercom terminal on board the spacecraft (not shown in FIG. 2) may receive a laser signal or laser beam containing information from a remote laser terminal 204 or from a similar device. The received signal power may be fed to block 206. In block 206, a determination may be made if the received signal power is greater than or above a predetermined threshold power. If the received signal power is below the predetermined threshold, the method 200 may advance to block 208. In block 208, a counter is reset.

In block 210, the FSM error is set to the LOS error estimate from a LOS error estimator 212. An example a of LOS error estimator that may be used for LOS error estimator 212 will be described with reference to FIG. 3.

The FSM error signal set equal to the LOS error estimate may then be transmitted to the FSM controller 214. Similar to that previously described, an FSM control algorithm 216 may be embodied in the FSM controller 214. The FSM controller 214 or FSM control algorithm 216 may generate a FSM control command signal compensated for any base jitter or motion of the laser communication terminal 202. The FSM control command signal controls movement of the FSM, such as FSM 108 in FIG. 1, to compensate for any base jitter or motion of the laser communication terminal 202 during a power fade condition. As previously described, a power fade condition may be when the signal power of the received laser beam or signal is below the predetermined threshold because of interference, noise or other causes.

Returning to block 206, if the signal power of the received laser beam or signal is above the predetermined threshold, the method 200 may advance to block 218. In block 218, a counter may be incremented. In block 220, a determination may be made if the counter has incremented above or exceeded a predetermined exit threshold. If the counter is not greater than the predetermined exit threshold, the method 200 will advance to block 210. As previously discussed, in block 210 the FSM error will be set to the LOS error estimate from the LOS error estimator 212.

If the counter is greater than the predetermined exit threshold in block 220, the method may advance to block 222. In block 222, the FSM error may be set to the measured LOS error from the onboard laser communication terminal 202 and the FSM error corresponding to the measured LOS error may be transmitted to the FSM controller 214 to generate a FSM control command for pointing control of the onboard laser communications terminal 202 similar to that previously described. Accordingly, the method 200 may switch from a LOS error measurement or LOS error measurement feedback to a LOS error estimate or LOS error estimate feedback for pointing control of the laser communications terminal 202 during power fade or when the signal power of the received laser beam or signal is below the predetermined threshold. Additionally, the method 200 will not switch back to using the LOS error measurement until the counter exceeds the exit threshold or until a selected number of signal power measurements of the received laser signal exceed the predetermined power threshold in block 206.

Similar to that previously described, a blended gyro signal may be generated by sensor fusion in block 224 from a spacecraft gyro measurement and gimbal gyro measurement. The LOS error estimate may be generated or estimated based on the measured LOS error, the measured FSM position and the blended gyro signal by the LOS error estimator 212. The LOS error estimator 212 may also receive an enable base jitter calibration input. LOS error estimates may also be determined from various combinations of inertia measurement units (IMU) that can sense the base motion of the laser communication terminal.

Figure 3:
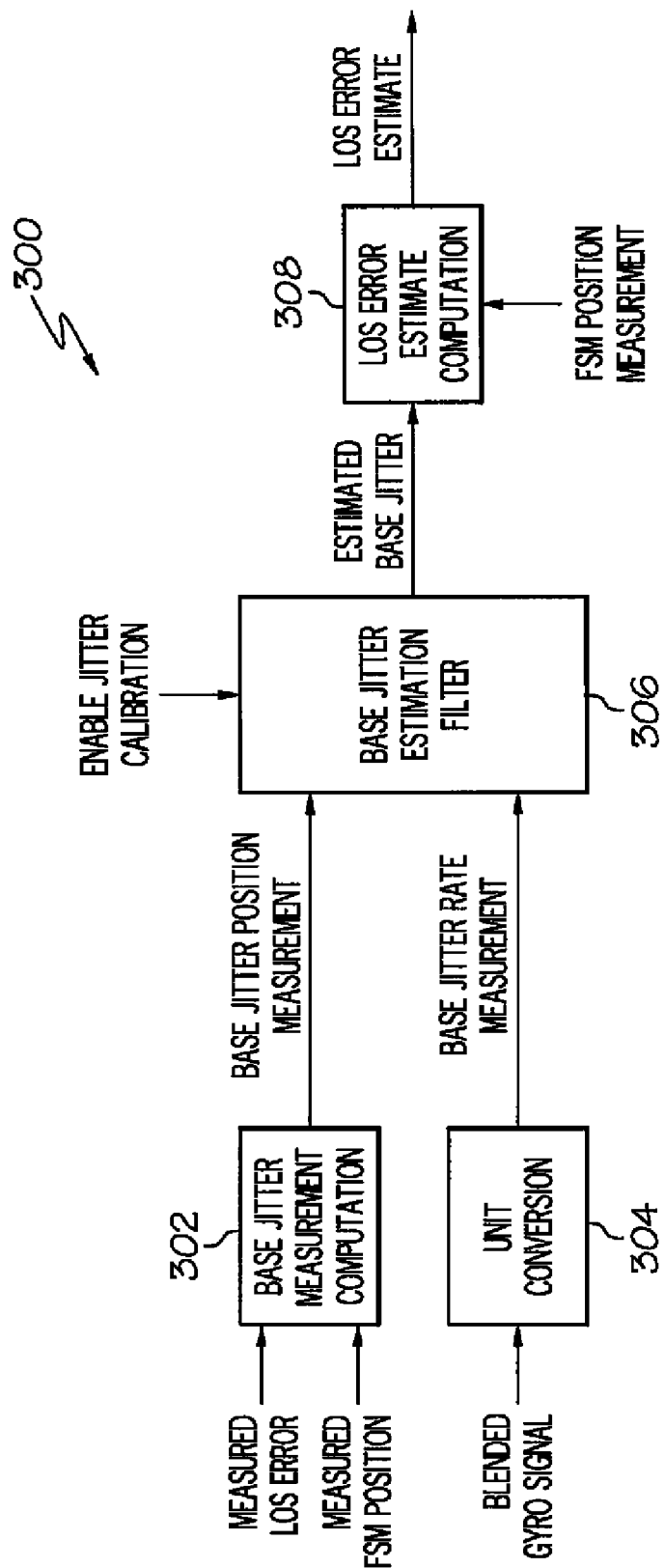
FIG. 3 is a block diagram of an example of a LOS error estimator in accordance with an embodiment of the present disclosure.

FIG. 3 is a block diagram of an example of a LOS error estimator 300 in accordance with an embodiment of the present disclosure. The LOS error estimator 300 may be used for the LOS error estimator 212 in FIG. 2. The LOS error estimator 300 may include a computational unit 302 or circuit for generating or determining a base jitter position measurement of the laser communications terminal 104 from the measured LOS error and the measured FSM position. The computational unit 302 may include circuitry or software to generate the base jitter measurement $\theta^m$ based on Equation 1:

$$\theta_k^m = -(\epsilon_k^{LOS} + \theta_k^{FSM})$$  Eq. 1

Where $\epsilon^{LOS}$ is the measured LOS error, $\theta^{FSM}$ is the measured FSM position. The subscript k represents the values at sampling time $t_k$.

The LOS error estimator 300 may also include a conversion unit 304 or computational unit or circuit for generating or determining a measured base jitter or base jitter rate of the laser communications terminal 104 from the blended gyro measurement of the spacecraft gyro and the gimbal gyro similar to that previously described. The blended gyro signal is converted to the units compatible with determination or calculation of a predicted base jitter in conversion unit 304 based on Equation 2:

$$\omega_k^b = C\omega_k^{blend}$$  Eq. 2

Where $\omega^{blend}$ is the blended gyro signal, $\omega^b$ is the blended gyro signal after the unit conversion, C is a unit conversion gain.

The LOS error estimator 300 may additionally include a computational unit or base jitter estimation filter 306 to estimate the base jitter of the laser communication terminal 104. In the base jitter estimation filter 306, a predicted base jitter $\bar{\theta}^b$ is generated by propagating the blended gyro signal, as represented by Equation 3:

$$\bar{\theta}_k^b = \hat{\theta}_{k-1}^b + \Delta t \omega_k^b$$  Eq. 3

Where $\hat{\theta}^b$ is the estimated base jitter, $\Delta t$ is the LOS estimator sampling period.

The base jitter estimation filter 306 includes a unit to compute or determine the base jitter measurement error or residue y according to Equation 4:

$$y_k = \theta_k^m - \bar{\theta}_k^b$$  Eq. 4

The estimated base jitter $\hat{\theta}^b$ is determined according to Equation 5 if Enable jitter calibration flag is true, otherwise $\hat{\theta}_k^b = \bar{\theta}_k^b$.

$$\hat{\theta}_k^b = \bar{\theta}_k^b + Ky_k$$  Eq. 5

Where K is an estimator gain for computing base jitter estimate corrections.

The LOS error estimator 300 may include a LOS error estimate computation unit 308 or circuit to determine the LOS error estimate $\hat{\epsilon}^{LOS}$ according to Equation 6:

$$\hat{\epsilon}_k^{LOS} = -\hat{\theta}_k^b - \theta_k^{FSM}$$  Eq. 6

The base jitter estimation filter 306 may be a filter containing circuitry or software or a combination thereof for performing computations represented by Equations 3 to 5, as previously described. In accordance with an embodiment, the base jitter estimation filter 306 may also be a Kalman filter with multiple states, such as base jitter position, base jitter rate, base jitter acceleration, etc.

In other specific, distinct embodiments, the disclosure may be applicable to vehicles or aircraft or similar applications.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A method for pointing control of a laser communication terminal onboard a spacecraft, comprising:

measuring a LOS error of the laser communication terminal, wherein measuring the LOS error comprises receiving a laser beam from a remote laser communications terminal by an optical receiver, the optical receiver providing a LOS error measurement;

estimating a LOS error of the laser communication terminal based on measurements from a spacecraft gyro and a gimbal gyro onboard the spacecraft; and measuring a FSM position of a fast steering mirror that controls pointing of the laser communication terminal for communications;

blending a measurement from the spacecraft gyro and a measurement from the gimbal gyro associated with a gimbal for pointing the laser communication terminal, to provide a base jitter rate of the laser communication terminal;

determining a LOS error estimate of the laser communication terminal from the measured LOS error, the measured FSM position and the blended gyro measurement from the spacecraft gyro and the gimbal gyro; and switching from a LOS error measurement feedback to a LOS error estimate feedback to control the FSM position for pointing of the laser communication terminal during a power fade condition.

2. The method of claim 1, further comprising:

determining a predicted base jitter of the laser communication terminal from the blended gyro measurement of the spacecraft gyro and the gimbal gyro;

determining a base jitter measurement error or residue of the laser communication terminal from the measured LOS error, the measured FSM position and the predicted base jitter;

determining a base jitter estimate correction from the measurement error or residue;

determining an estimated base jitter from the predicted base jitter and the base jitter estimate correction; and determining the LOS error estimate from the estimated base jitter and the measured FSM position.

3. The method of claim 1, further comprising:

determining a base jitter position measurement from the measured LOS error and the measured FSM position;

determining a base jitter rate measurement from the blended measurement from the spacecraft gyro and the gimbal gyro;

determining an estimated base jitter from the base jitter position measurement and the base jitter rate measurement; and determining the LOS error estimate from the estimated base jitter and measured FSM position.

4. The method of claim 3, wherein determining an estimated base jitter from the base jitter position measurement and the base jitter rate measurement comprises using a Kalman filter.

5. The method of claim 1, further comprising using the LOS error estimate to generate a FSM control command for pointing control of the laser communication terminal in response to a measured signal power of a laser signal from a remote laser communication terminal being below a predetermined threshold, and wherein the measured LOS error is used to generate the FSM control command for pointing control of the laser communication terminal in response to the measured signal power from the remote laser communication terminal being greater than the predetermined threshold for a selected number of signal power measurements after the measured signal power is measured as being below the predetermined threshold.

6. The method of claim 1, further comprising:

resetting a counter in response to a measured signal power of a laser signal from a remote laser communication terminal being less than a predetermined threshold;

incrementing the counter each time the measured signal power is greater than the predetermined threshold;

using the LOS error estimate to generate a FSM control command for pointing control of the laser communication terminal in response to the counter being less than a preset exit threshold even though the measured signal power of the laser signal received from the remote laser communication terminal is greater than the predetermined threshold; and using the LOS error measurement to generate the FSM control command for pointing control of the laser communication terminal in response to the measured signal power of the laser signal received from the remote laser communication terminal being greater than the predetermined threshold and the counter being greater than the preset exit threshold.

7. A method for pointing control of a laser communication terminal onboard a spacecraft, comprising:

determining an estimated base jitter of the laser communication terminal;

measuring a LOS error of the laser communication terminal, wherein measuring the LOS error comprises receiving a laser beam from a remote laser communications terminal by an optical receiver, the optical receiver providing a LOS error measurement;

measuring a FSM position of a fast steering mirror that controls pointing of the laser communication terminal for communications;

measuring a signal power of a laser signal received by the laser communication terminal from a remote laser communication terminal being tracked by the laser communication terminal for communications with the remote laser communication terminal;

estimating a LOS error based on the estimated base jitter of the laser communication terminal and the measured FSM position;

using the LOS error estimate as a FSM error to control positioning of the fast steering mirror in response to the measured signal power of the laser signal received from the remote laser communication terminal being less than a predetermined threshold; and using the measured LOS error as the FSM error to control positioning of the fast steering mirror in response to the measured signal power being greater than the predetermined threshold.

8. The method of claim 7, further comprising determining a base jitter or motion of the laser communication terminal by determining a base motion of the laser communication terminal using a spacecraft gyro and a gimbal gyro onboard the spacecraft.

9. The method of claim 7, further comprising determining a base jitter or motion of the laser communication terminal by measuring an angular velocity of a base motion of the laser communication terminal using measurements from the spacecraft gyro and the gimbal gyro associated with the laser communication terminal.

10. The method of claim 9, wherein determining the base jitter or motion of the laser communication terminal comprises:

acquiring a spacecraft gyro measurement;

acquiring a gimbal gyro measurement from a gyro coupled to a gimbal for positioning the laser communication terminal; and blending the spacecraft gyro measurement and the gimbal gyro measurement to provide a rate measurement of the base jitter or motion of the laser communication terminal.

11. The method of claim 7, further comprising:

resetting a counter in response to the measured signal power being less than a predetermined threshold;

incrementing the counter each time the measured signal power is greater than the predetermined threshold;

using the LOS error estimate as the FSM error to control positioning of the fast steering mirror in response to the counter being less than a preset exit threshold even though the measured signal power of the laser signal received from the remote laser communication terminal is greater than the predetermined threshold; and using the LOS error measurement as the FSM error to control positioning of the fast steering mirror in response to the measured signal power of the laser signal received from the remote laser communication terminal being greater than the predetermined threshold and the counter being greater than the preset exit threshold.

12. A system for pointing control of a laser communication terminal onboard a spacecraft, comprising:
- a processor in the laser communication terminal mounted onboard the spacecraft;
- an optical receiver in the laser communication terminal for receiving a laser beam from a remote laser communications terminal to provide a LOS error measurement;
- a gyro-aided fine track control module operable on the processor, the gyro-aided fine track control module comprising:
  - a sensor fusion module adapted to blend a measurement from a spacecraft gyro and a measurement from a gimbal gyro associated with a gimbal for pointing the laser communication terminal, to provide a base jitter rate of the laser communication terminal;
  - a LOS error estimator adapted to estimate a LOS error based on measurements from the spacecraft gyro and the gimbal gyro onboard the spacecraft, the LOS error estimator being adapted to determine an LOS error estimate from the LOS error measurement, a measured FSM position and the blended gyro measurement from the spacecraft gyro and the gimbal gyro; and
  - switching logic module adapted to switch from using the LOS error measurement to using the LOS error estimate to generate a FSM command for pointing control of the laser communication terminal during a power fade condition.

13. The system of claim 12, wherein the LOS error estimator comprises:
- a computation unit for propagating a predicted base jitter of the laser communication terminal from the blended gyro measurement of the spacecraft gyro and the gimbal gyro;
- a computation unit for determining a base jitter measurement error or residue from the measured LOS error, the measured FSM position and the predicted base jitter;
- a computation unit for determining a base jitter estimate correction from the base jitter measurement error or residue;
- a computation unit for determining an estimated base jitter from the predicted base jitter and the base jitter estimate correction; and
- a computation unit for determining the LOS error estimate from the estimated base jitter and the measured FSM position.

14. The system of claim 12, wherein the LOS error estimator comprises:
- a computation unit to combine the measured LOS error and the measured FSM position to provide a base jitter position measurement;
- a conversion unit to provide a base jitter rate measurement;
- a base jitter estimation filter to generate an estimated base jitter of the laser communication terminal from the base jitter position measurement, the base jitter rate measurement and an enable jitter calibration signal; and
- a computation unit to combine the estimated base jitter and the FSM position measurement to provide the LOS error estimate.

15. The system of claim 12, further comprising:
- a counter, wherein the counter is incremented each time a measured signal power of a laser signal from a remote laser communication terminal is greater than a predetermined threshold and wherein the counter is reset in response to the measured signal power being less than the predetermined threshold; and
- a switching arrangement, the switching arrangement comprising:
  - means for using the LOS error estimate as the FSM error to control positioning of a fast steering mirror of the laser communication terminal in response to the counter being less than a preset exit threshold even though the measured signal power of the laser signal received from the remote laser communication terminal is greater than the predetermined threshold; and
  - means for using the LOS error measurement as the FSM error to control positioning of the fast steering mirror in response to the measured signal power of the laser signal received from the remote laser communication terminal being greater than the predetermined threshold and the counter being greater than the preset exit threshold.

16. A computer program product for controlling pointing of a laser communication terminal onboard a spacecraft, the computer program product comprising:
- a computer readable storage medium having computer readable program code embodied therewith, the computer readable program code comprising:
  - computer readable program code configured to measure a LOS error of the laser communication terminal, wherein the computer readable program code configured to measure the LOS error from a laser beam received from a remote laser communications terminal by an optical receiver;
  - computer readable program code configured to estimate a LOS error of the laser communication terminal based on measurements from a spacecraft gyro and a gimbal gyro onboard the spacecraft;
  - computer readable program code configured to blend a measurement from the spacecraft gyro and a measurement from the gimbal gyro associated with a gimbal for pointing the laser communication terminal, to provide a base jitter rate of the laser communication terminal;
  - computer readable program code configured to determine an LOS error estimate of the laser communication terminal from the measured LOS error, a measured FSM position and the blended gyro measurement from the spacecraft gyro and the gimbal gyro; and
  - computer readable program code configured to switch from a LOS error measurement feedback to a LOS error estimate feedback for controlling pointing of the laser communication terminal during a power fade condition.

* * * * *